Figure 1:
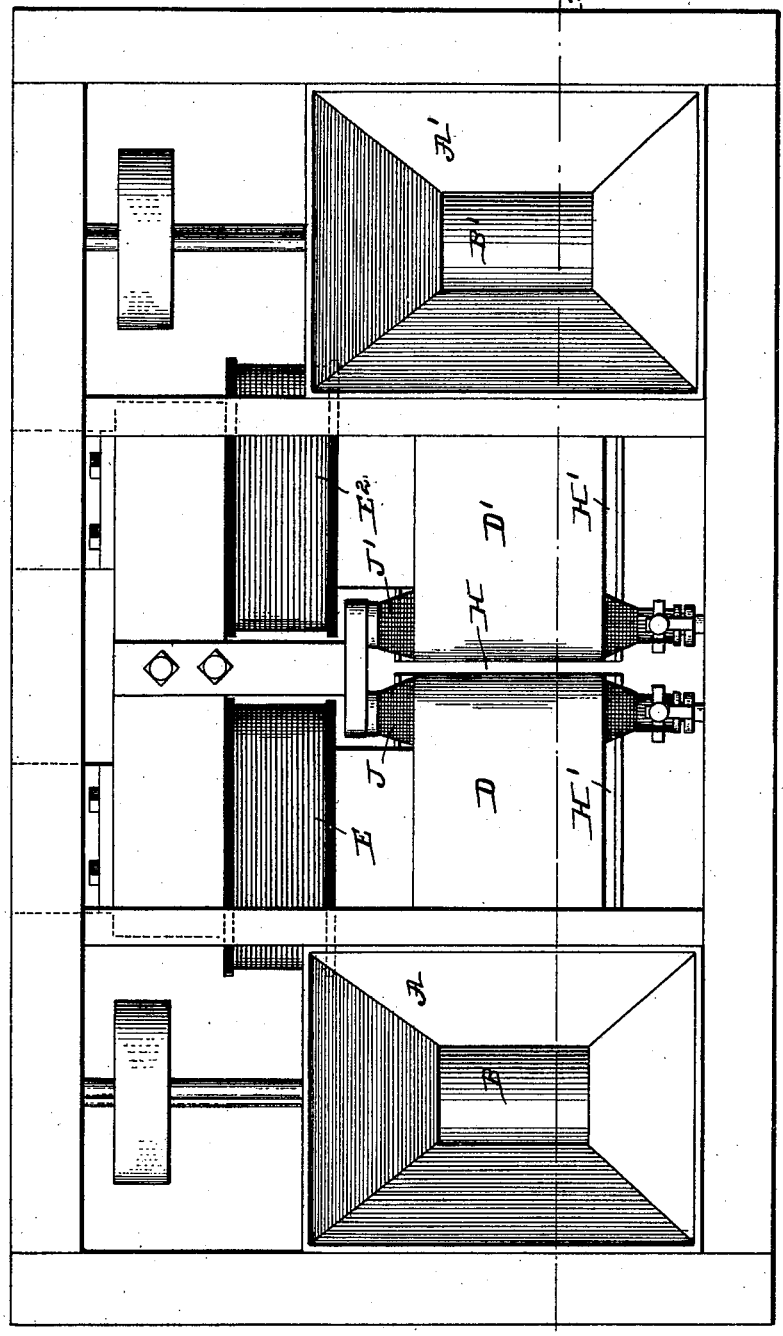

(No Model.)

3 Sheets—Sheet 2.

L. G. ROWAND.
MAGNETIC ORE SEPARATOR.

No. 590,809.

Patented Sept. 28, 1897.

Witnesses.

Inventor.

Attorney.

(No Model.) 3 Sheets—Sheet 3.
L. G. ROWAND.
MAGNETIC ORE SEPARATOR.

No. 590,809. Patented Sept. 28, 1897.

Witnesses.
Jesse B. Heller
Carol H. Deshongs

Inventor.
Lewis G. Rowand
W. G. Harding
Attorney.

UNITED STATES PATENT OFFICE.

LEWIS G. ROWAND, OF CAMDEN, NEW JERSEY.

MAGNETIC ORE-SEPARATOR.

SPECIFICATION forming part of Letters Patent No. 590,809, dated September 28, 1897.

Application filed January 22, 1897. Serial No. 620,218. (No model.)

*To all whom it may concern:*

Be it known that I, LEWIS G. ROWAND, a citizen of the United States, residing at Camden, county of Camden, and State of New Jersey, have invented a new and useful Improvement in Magnetic Ore-Separators, of which the following is a full, clear, and exact description, reference being had to the accompanying drawings, which form a part of this specification.

My invention has for its object the production of certain improvements in magnetic ore-separators to make their construction more simple and less expensive and to cause the separation to be more certainly and better carried out. To that end, speaking generally, instead of charging the magnet from a source independent of itself and using separate mechanism to drive the conveying-belts, &c., I use an electric machine to generate the magnetic field and use said machine not only to form a magnetic field, but by connecting said machine and the conveying-belts, &c., I can operate the same from a single source of power or use the electric machine to drive the conveying-belts, &c. In a certain application filed by me December 22, 1896, serially numbered 616,671, I have described and illustrated a machine having this same general object and carried out generally in the same manner. In that machine the construction is such that the electric machine may be either a dynamo driven from a source of power or may be a motor driven from a dynamo.

The construction forming the subject of this application has certain advantages; but in obtaining such advantages it is necessary that the electric machine shall be a motor, and this invention relates to certain improved construction where the electric machine is a motor.

I will describe my invention as illustrated in the drawings, in which—

Figure 2:
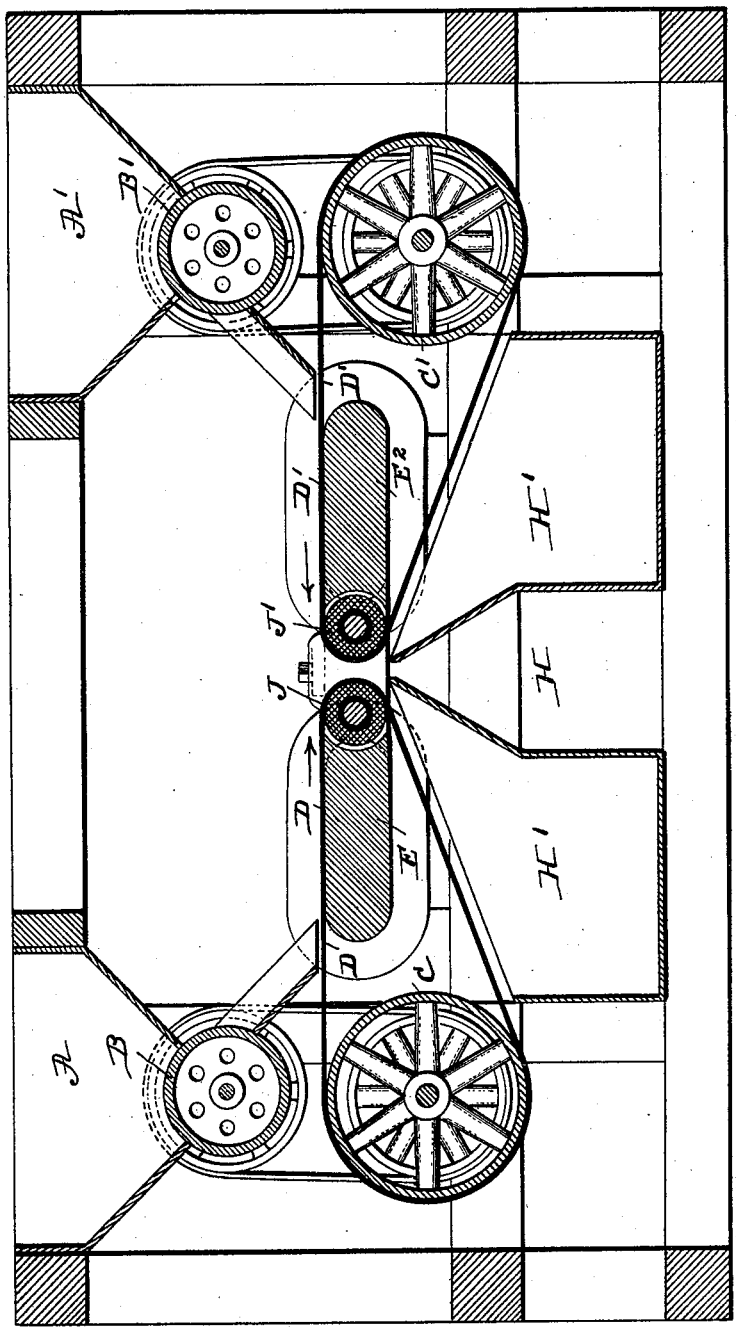
Figure 3:
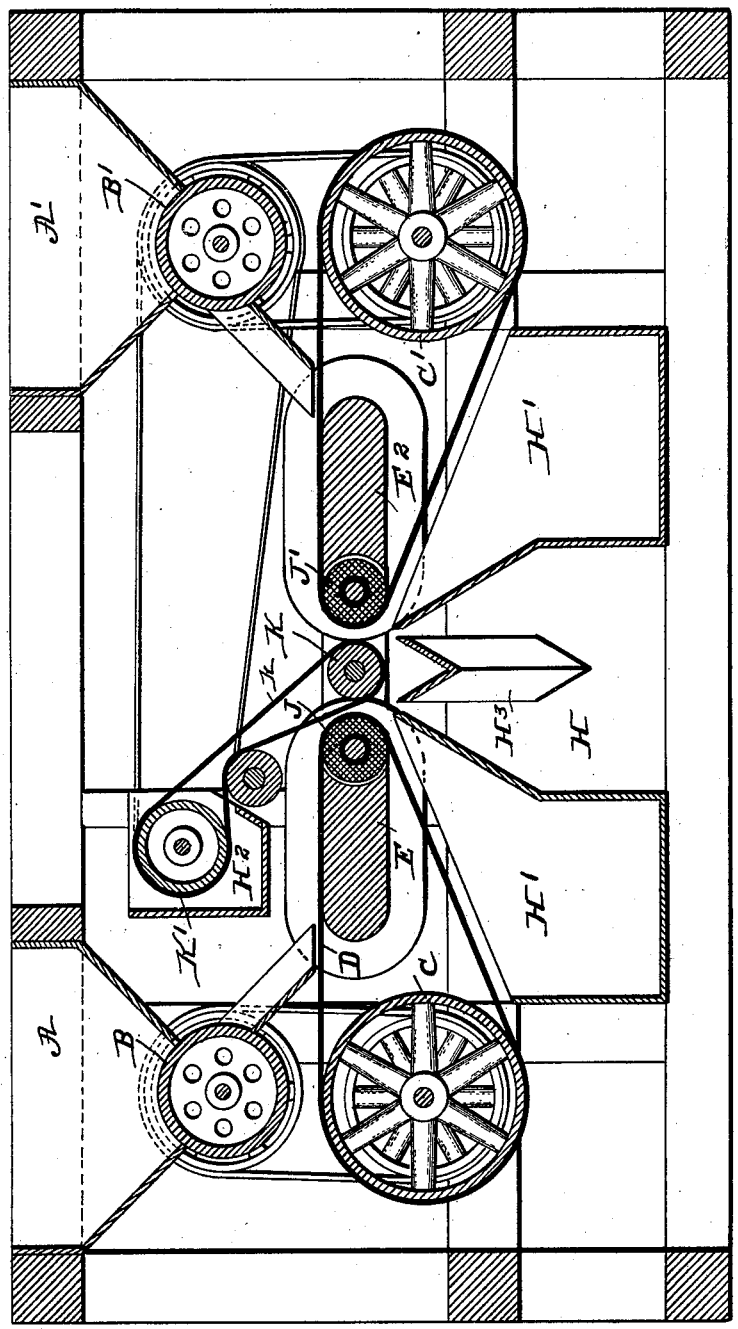

Figure 1 is a plan view of my invention. Fig. 2 is a sectional view on the line $x\ x$ of Fig. 1. Fig. 3 is a view similar to Fig. 2 of a modified form.

A A' are the ore-hoppers.

B B' are the feed-rollers.

C and C' are the belt-conveying rollers, and D D' the conveyer-belts.

J J' Figs. 1 and 2 are the armatures, having field-magnets E and $E^2$, respectively. The conveyers pass around these armatures J J' and are driven by the revolution of the armature.

In the construction shown in Fig. 3 intermediate of the armatures J J' of Fig. 2 is placed a soft-iron roller K, which is connected by a belt $k$ with the roller K', which in turn is connected by a belt with the shaft of roller B'. Any magnetic material tending to catch upon said roller falls either into the receptacle $H^3$ or is carried by the belt around the roller K' and falls into the receptacle $H^2$.

Beneath the conveyer-belts, both in Figs. 2 and 3, beyond the magnetic field, are placed the hoppers H'. Beneath the belts, within the magnetic field, is placed a space H, into which any non-magnetic material which is carried by the conveyers around the armature-rollers will fall, while the magnetic material will be carried around, still clinging to the belt, until it passes beyond the magnetic field, when it will fall into the receptacles H'. The specific object of this construction is the ease with which the belt can be driven, and in this construction the electric machine which I use is a motor.

Having now fully described my invention, what I claim, and desire to protect by Letters Patent, is—

1. In a magnetic ore-separator, an electric machine having double armatures, conveyer-belts each extending within and beyond the magnetic field of the electric machine, there being a space beneath said conveyers within vertical lines through the horizontal limits of the magnetic field and a receptacle beneath each conveyer beyond the magnetic field.

2. In a magnetic ore-separator, an electric machine having double armatures, conveyer-belts each extending within and beyond the magnetic field of the electric machine, there being a space beneath said conveyers within vertical lines through the horizontal limits of the magnetic field and a receptacle beneath each conveyer beyond the magnetic field, and connection between one armature and the driving-pulley of one conveyer, and between the other armature and the driving-pulley of the other conveyer.

3. In a magnetic ore-separator, an electric machine having double armatures, conveyer-belts each extending within and beyond the magnetic field of the electric machine, there being a space beneath said conveyers within vertical lines through the horizontal limits of the magnetic field and a receptacle beneath each conveyer beyond the magnetic field, and a magnetic metal piece between the two armatures of the electric machines.

4. In a magnetic ore-separator, an electric machine having double armatures, conveyer-belts each extending within and beyond the magnetic field of the electric machine, a receptacle beneath each conveyer within the magnetic field, there being a space beneath said conveyers within vertical lines through the horizontal limits of the magnetic field, a magnetic metal roller between the armatures, a conveyer extending from said roller to a point without the magnetic fields, a receptacle beneath said conveyer within the magnetic fields, and a receptacle beneath said conveyer beyond the magnetic field.

In testimony of which invention I have hereunto set my hand.

LEWIS G. ROWAND.

Witnesses:
A. R. RAYMOND,
FRANK P. WILLETS.